United States Patent
Shibata

(10) Patent No.: US 12,352,691 B2
(45) Date of Patent: Jul. 8, 2025

(54) METHOD OF ANALYZING DEGREE OF HYDROGENATION OF HYDROGENATED DIENE POLYMER

(71) Applicant: SUMITOMO RUBBER INDUSTRIES, LTD., Kobe (JP)

(72) Inventor: Yusuke Shibata, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 211 days.

(21) Appl. No.: 18/225,423

(22) Filed: Jul. 24, 2023

(65) Prior Publication Data

US 2024/0060882 A1  Feb. 22, 2024

(30) Foreign Application Priority Data

Aug. 22, 2022 (JP) .................... 2022-131921
Jun. 26, 2023 (JP) .................... 2023-104118

(51) Int. Cl.
G01N 21/35 (2014.01)
G01N 21/3563 (2014.01)

(52) U.S. Cl.
CPC ............ *G01N 21/3563* (2013.01); *G01N 2201/127* (2013.01)

(58) Field of Classification Search
CPC ............ G01N 21/3563; G01N 2201/127
See application file for complete search history.

(56) References Cited

U.S. PATENT DOCUMENTS

2024/0301246 A1* 9/2024 Miyamura ............ C09J 7/29

* cited by examiner

*Primary Examiner* — Hugh Maupin
(74) *Attorney, Agent, or Firm* — Birch, Stewart, Kolasch & Birch, LLP

(57) ABSTRACT

Provided is an analysis method that enables simple analysis of the degree of hydrogenation of a hydrogenated diene polymer. The present disclosure relates to a method of analyzing the degree of hydrogenation of a hydrogenated diene polymer using infrared absorption spectroscopy, the method including use of a calibration curve represented by the following equation (1): $2H-Vin=aA2915+b$ where H is the degree of hydrogenation (%) of a hydrogenated diene polymer, Vin is the vinyl percentage (%) of the hydrogenated diene polymer, A2915 is the peak intensity of a peak attributed to $CH_2$ antisymmetric stretching vibration, and a and b are each a constant.

5 Claims, 3 Drawing Sheets

METHOD OF ANALYZING DEGREE OF HYDROGENATION OF HYDROGENATED DIENE POLYMER

TECHNICAL FIELD

The present disclosure relates to a method of analyzing the degree of hydrogenation of a hydrogenated diene polymer.

BACKGROUND ART

Hydrogenated diene polymers such as hydrogenated styrene-butadiene copolymers and hydrogenated polybutadiene polymers are used as materials for rubber compositions applied to products such as tires. The property analysis of such hydrogenated diene polymers is generally performed using methods such as $^1$H NMR. The conventional methods, however, require time for sample preparation and measurement, and therefore a simple analysis method is desired.

SUMMARY OF DISCLOSURE

Technical Problem

The present disclosure aims to solve the above problem and provide an analysis method that enables simple analysis of the degree of hydrogenation of a hydrogenated diene polymer.

Solution to Problem

The present disclosure relates to a method of analyzing a degree of hydrogenation of a hydrogenated diene polymer using infrared absorption spectroscopy,
  the method including use of a calibration curve represented by the following equation (1):

$$2H-Vin=aA2915+b$$

where H is a degree of hydrogenation (%) of a hydrogenated diene polymer, Vin is a vinyl percentage (%) of the hydrogenated diene polymer, A2915 is a peak intensity of a peak attributed to $CH_2$ antisymmetric stretching vibration, and a and b are each a constant.

Advantageous Effects of Disclosure

Since the method of analyzing the degree of hydrogenation of a hydrogenated diene polymer using infrared absorption spectroscopy of the present disclosure includes the use of a calibration curve represented by equation (1), it can easily analyze the degree of hydrogenation of a hydrogenated diene polymer.

DESCRIPTION OF EMBODIMENTS

Figure 1:
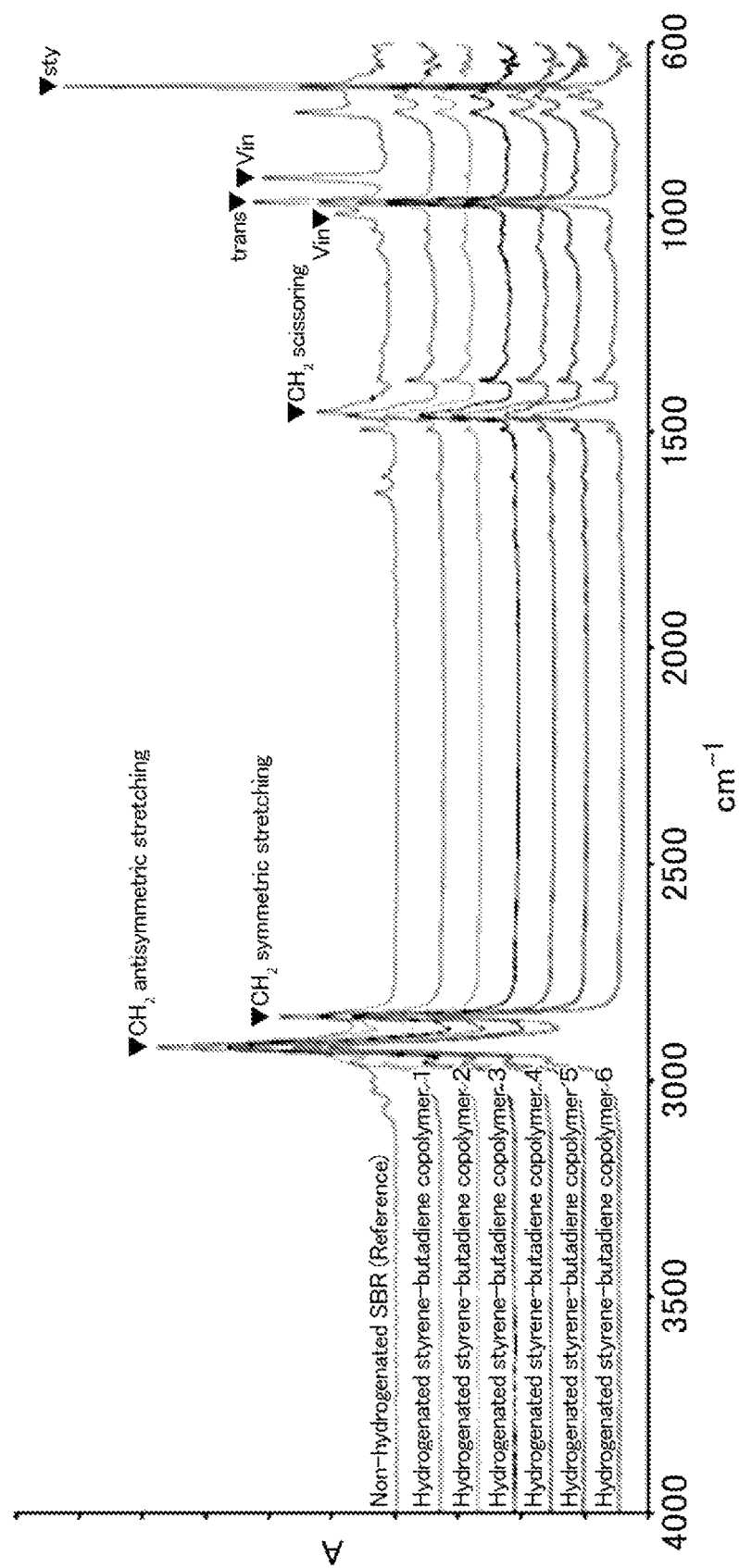
FIG. 1 is a chart showing infrared absorption spectra of hydrogenated styrene-butadiene copolymers 1 to 6 and a non-hydrogenated styrene-butadiene copolymer.

The present disclosure relates to a method of analyzing the degree of hydrogenation of a hydrogenated diene polymer using infrared absorption spectroscopy, which includes the use of a calibration curve represented by the following equation (1):

$$2H-Vin=aA2915+b$$

where H is the degree of hydrogenation (%) of a hydrogenated diene polymer, Vin is the vinyl percentage (%) of the hydrogenated diene polymer, A2915 is the peak intensity of a peak attributed to $CH_2$ antisymmetric stretching vibration, and a and b are each a constant.

For example, first, two or more hydrogenated diene polymers with known vinyl percentages (%) and known degrees of hydrogenation (%) may be subjected to infrared absorption spectroscopy to obtain spectra. Then, a and b (constants) of the equation: $2H-Vin=aA2915+b$ may be determined based on the relationship between the value of A2915 (horizontal axis), which is the intensity of a $CH_2$ antisymmetric stretching vibration peak at around 2915 $cm^{-1}$ in each of the spectra, and the value of "2H−Vin" (vertical axis) calculated from H (the known degree of hydrogenation %) of each hydrogenated diene polymer) and Vin (the known vinyl percentage (%) of each hydrogenated diene polymer), thereby creating a calibration curve.

Then, for example, a hydrogenated diene polymer sample with a known vinyl percentage (%) and an unknown degree of hydrogenation (%) may be subjected to infrared absorption spectroscopy to obtain an infrared absorption spectrum and determine the intensity of a $CH_2$ antisymmetric stretching vibration peak at around 2915 $cm^{-1}$. Subsequently, the measured peak intensity value may be applied to the calibration curve to determine the value "2H−Vin" of the sample (H: the degree of hydrogenation (%) of the sample, Vin: the vinyl percentage (%) of the sample), which may be used with the known vinyl percentage (%) of the sample to calculate the unknown degree of hydrogenation, H, (%) of the hydrogenated diene polymer sample.

Thus, according to the method of the present disclosure, it is possible to easily analyze the degree of hydrogenation of a hydrogenated diene polymer sample with an unknown degree of hydrogenation.

Exemplary embodiments of the present disclosure will be described in detail below, but the present disclosure is not limited to such embodiments and can be implemented in various modified embodiments.

The present disclosure relates to a method of analyzing the degree of hydrogenation of a hydrogenated diene polymer having an unknown degree of hydrogenation using infrared absorption spectroscopy, which particularly includes the use of a calibration curve represented by the following equation (1)

$$2H-Vin=aA2915+b$$

where H is the degree of hydrogenation (%) of a hydrogenated diene polymer, Vin is the vinyl percentage (%) of the hydrogenated diene polymer, A2915 is the peak intensity of a peak attributed to $CH_2$ antisymmetric stretching vibration, and a and b are each a constant.

Examples of hydrogenated diene polymers that may be applied as analysis targets and hydrogenated diene polymers that may be used to create a calibration curve include hydrogenated products of homopolymers or copolymers of at least one conjugated diene, and hydrogenated products of copolymers of at least one conjugated diene and at least one aromatic vinyl compound. The copolymers of at least one conjugated diene and at least one aromatic vinyl compound may be either random or block copolymers. Hereinafter, the homopolymers or copolymers of at least one conjugated diene and the copolymers of at least one conjugated diene and at least one aromatic vinyl compound are comprehensively referred to as "conjugated diene (co)polymers".

Examples of the conjugated diene constituting the conjugated diene (co) polymers include 1,3-butadiene, isoprene, 2,3-dimethyl-1,3-butadiene, 1,3-pentadiene, 2-methyl-1,3-pentadiene, 1,3-hexadiene, 4,5-diethyl-1,3 octadiene, 3-butyl-1,3-octadiene, and chloroprene. Preferred among these are 1,3-butadiene, isoprene, and 1 pentadiene, with 1,3-butadiene being more preferred.

Examples of the aromatic vinyl compound constituting the conjugated diene (co)polymers include styrene, t-butylstyrene, α-methylstyrene, p-methylstyrene, vinylxylene, monochlorostyrene, dichlorostyrene, monobromostyrene, dibromostyrene, fluorostyrene, p-t-butylstyrene, ethylstyrene, vinylnaphthalene, divinylbenzene, 1,1-diphenylstyrene, N,N-diethyl-p-amiroethylstyrene, N,N-diethyl-p-aminoethylstyrene, and vinylpyridine. Preferred among these are styrene and α-methylstyrene, with styrene being more preferred.

The mass ratio of the conjugated diene and the aromatic vinyl compound constituting the conjugated diene (co)polymers is not limited but is preferably 100:0 to 20:80, more preferably 97:3 to 40:60.

Non-limiting examples of the hydrogenated diene polymers include polymers that are solid at 25° C. and can be used as rubber components or the like, and liquid polymers that are liquid at 25° C. and can be used as plasticizers or the like.

The degree of hydrogenation of the hydrogenated diene polymers are not limited, and any degree of hydrogenation can be measured. From the standpoint of tire performance, the degree of hydrogenation of the hydrogenated diene polymers is preferably 60 mol % or higher, more preferably 75 mol %; or higher, but is preferably 99 mole or lower, more preferably 98 mol % or lower. Here, the degree of hydrogenation of the hydrogenated diene polymers refers to the percentage of the hydrogenated conjugated diene units in the polymer.

Moreover, the degree of hydrogenation can be calculated from the rate of decrease in the unsaturated bond signals in the $^1$H-NMR spectrum measured.

When the hydrogenated diene polymers have a high molecular weight like rubber components, such rubber components contribute to crosslinking and generally correspond to polymer components which have a weight average molecular weight (Mw) of 10,000 or more and which are not extractable with acetone. The rubber components are solid at room temperature (25° C.).

The weight average molecular weight of the rubber components is preferably 50,000 or more, more preferably 150,000 or more, still more preferably 200,000 or more, but is preferably 2,000,000 or less, more preferably 1,500,000 or less, still more preferably 1,000,000 or less. A weight average molecular weight within the range indicated above tends to be able to impart desired properties such as tire performance.

When the hydrogenated diene polymers correspond to, for example, rubber components which are solid at 25° C., examples of the rubber components constituting the skeleton of the hydrogenated diene polymers include diene rubbers such as isoprene-based rubbers, polybutadiene rubbers (BR), styrene-butadiene rubbers (SBR), styrene-isoprene-butadiene rubbers (SIBR), ethylene-propylene-diene rubbers (EPDM), chloroprene rubbers (CR), and acrylonitrile-butadiene rubbers (NBR). From the standpoint of analysis accuracy, isoprene-based rubbers, BR, and SBR are preferred among these, with BR and SBR being more preferred, with SBR being still more preferred. These may be used alone or in combinations of two or more.

The diene rubbers may be either unmodified or modified diene rubbers.

The modified diene rubbers may be any diene rubber having functional group interactive with filler such as silica. Examples include a chain end-modified diene rubber obtained by modifying at least one chain end of a diene rubber with a compound (modifier) having the above functional group (i.e., a chain end-modified diene rubber terminated with the functional group); a backbone-modified diene rubber having the functional group in the backbone; a backbone- and chain end-modified diene rubber having the functional group in both the backbone and chain end (e.g., a backbone- and chain end-modified diene rubber in which the backbone has the functional group and at least one chain end is modified with the modifier); and a chain end-modified diene rubber into which a hydroxy or epoxy group has been introduced by modification (coupling) with a polyfunctional compound having two or more epoxy groups in the molecule.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted.

When the hydrogenated diene polymers are liquid diene polymers which are liquid at 25° C., examples of the liquid diene polymers constituting the skeleton of the hydrogenated diene polymers include liquid styrene-butadiene copolymers, liquid polybutadiene polymers, liquid polyisoprene polymers, liquid styrene-isoprene copolymers, liquid styrene-butadiene-styrene block copolymers (liquid SBS block polymers), liquid styrene-isoprene-styrene block copolymers (liquid SIS block polymers), liquid farnesene polymers, and liquid farnesene-butadiene copolymers, all of which are liquid at 25° C. As in the case of the rubber components described above, these liquid diene polymers may be modified. From the standpoint of analysis accuracy, liquid styrene-butadiene copolymers, liquid polybutadiene polymers, and liquid polyisoprene polymers are preferred among these, with liquid styrene-butadiene copolymers and liquid polybutadiene polymers being more preferred, with liquid styrene-butadiene copolymers being still more preferred.

From the standpoint of tire performance, the weight average molecular weight (Mw) of the liquid diene polymers is preferably 2,000 or more, more preferably 3,000 or more, while it is preferably 100,000 or less, more preferably 10,000 or less, still more preferably 7,000 or less.

Herein, the weight average molecular weight (Mw) can be determined by gel permeation chromatography (GPC) (CPC-8000 series available from Tosoh Corporation, detector: differential refractometer, column: TSKgel SuperMultipore HZ-M available from Tosoh Corporation) calibrated with polystyrene standards.

The hydrogenated diene polymers can produced, for example, by dissolving any of the conjugated diene (co) polymers in a hydrocarbon solvent and performing a hydrogenation reaction in pressurized hydrogen at 20 to 100 kg/cm$^2$ in the presence of a hydrogenation catalyst. Examples of the hydrogenation catalyst include catalysts obtained by supporting a noble metal such as palladium or ruthenium on a carrier such as silica, carbon, or diatomaceous earth; acyclic catalysts of rhodium, ruthenium, etc.; catalysts including an organic carboxylate of cobalt, nickel, or other metal and an organoaluminum or organolithium compound; and catalysts including a titanium compound (e.g., dicyclopentadienyltitanium dichloride, dicyclopentadienyldiphenyltitanium) and an organometallic compound containing lithium, aluminum, or magnesium.

In the method of the present disclosure, which is a method of analysis using a calibration curve represented by equation (1), for example, the calibration curve may be created by using hydrogenated diene polymers each of which has at least a known vinyl percentage (%) (a known vinyl content (%) of the hydrogenated diene polymer) and a known degree of hydrogenation (%) (e.g., hydrogenated styrene-butadiene copolymers 1 to 6 with known styrene percentages (%), known vinyl percentages (%), and known degrees of hydrogenation (%) shown in Table 1 below).

TABLE 1

| Hydrogenated diene polymer species | Styrene percentage (%) | Vinyl percentage (%) | Degree of hydrogenation (%) |
|---|---|---|---|
| Hydrogenated styrene-butadiene copolymer 1 | 9 | 35 | 72 |
| Hydrogenated styrene-butadiene copolymer 2 | 8 | 37 | 77 |
| Hydrogenated styrene-butadiene copolymer 3 | 8 | 35 | 74 |
| Hydrogenated styrene-butadiene copolymer 4 | 8 | 34 | 84 |
| Hydrogenated styrene-butadiene copolymer 5 | 8 | 26 | 59 |
| Hydrogenated styrene-butadiene copolymer 6 | 8 | 25 | 76 |

Upon the creation of the calibration curve, first, the hydrogenated styrene butadiene copolymers 1 to 6 with known styrene percentages (%), known vinyl percentages (%), and known degrees of hydrogenation (%) or the like may be subjected to infrared absorption spectroscopy. Thus, the infrared absorption spectra of the hydrogenated styrene-butadiene copolymers 1 to 6 or the like shown in FIG. 1 may be obtained, e.g., using FT-IR.

Any infrared absorption spectroscopic method may be employed, such as a transmission method or an attenuated total reflection (ATR) method.

Preferred among these is an ATR method.

When light is incident from a first transparent medium (ATR prism) with a large refractive index into a second transparent medium (material to be measured) with a small refractive index, the phenomenon of total reflection (ATR) occurs if the incident angle exceeds a certain angle. However, this total reflection does not mean that no light is incident into the second medium. Rather, there exists an evanescent field where the light that has passed through the first medium travels along the boundary surface with the second medium and its amplitude exponentially decreases in proportion to the distance from the boundary surface. When there is a substance in the evanescent field, specific light absorption by the substance occurs, resulting in an infrared absorption spectrum. The ATR method applies this principle.

FIG. 1 shows infrared absorption spectra of the hydrogenated styrene-butadiene copolymers 1 to 6 with known styrene percentages (%), known vinyl percentages (%), and known degrees of hydrogenation (%) and a non-hydrogenated styrene-butadiene copolymer. The spectra show peaks attributed to a styrene unit (sty), a vinyl unit (vin), a trans unit (trans), $CH_2$ antisymmetric stretching vibration, $CH_2$ symmetric stretching vibration, and $CH_2$ scissoring vibration.

The infrared absorption spectra in FIG. 1 can be obtained by, for example, FT-IR measurement.

The FT-IR measurement is not limited, and can be performed using a known device. For example, it may be performed using Frontier with ATR MIRacle (Ge) (PerkinElmer) with a wavenumber resolution of 4 $cm^{-1}$ and a cumulative number of scans of 16. The measurement device and conditions may be changed as appropriate.

In the spectra of the hydrogenated styrene-butadiene copolymers 1 to 6 in FIG. 1, almost no peak attributed to a vinyl unit was observed, suggesting that almost all vinyl units were hydrogenated. The method of analyzing the degree of hydrogenation of the present disclosure is particularly suitably applicable to hydrogenated diene polymers each having a known vinyl percentage (%) among the microstructures of the polymer. Particularly for hydrogenated styrene-butadiene copolymers, the method of the present disclosure is suitably applicable to samples with known vinyl percentages) and known styrene percentages (%). Moreover, the method of the present disclosure is suitably applicable to hydrogenated diene polymers satisfying the following relationship (2), i.e., hydrogenated diene polymers with degrees of hydrogenation (%) equal to or greater than the respective vinyl percentages (%):

$$H \geq Vin \qquad (2)$$

where H is the degree of hydrogenation (%) of the hydrogenated diene polymer, and Vin is the vinyl percentage (%) of the hydrogenated diene polymer.

FIG. 1 shows that, as the degree of hydrogenation of the hydrogenated diene polymer increases, the intensity of a trans peak at 965 $cm^{-1}$ decreases and the intensities of $CH_2$ peaks at 2917 $cm^{-1}$, 2848 $cm^{-1}$, and 1448 $cm^{-1}$ increase. The intensity of the $CH_2$ antisymmetric stretching vibration peak at around 2915 $cm^1$ is particularly used in the present disclosure. The use of such a peak with a high peak intensity can enhance the analysis accuracy.

Next, the peak intensity (A2915) of a peak attributed to $CH_2$ antisymmetric stretching vibration may be measured for each polymer based on each infrared absorption spectrum FIG. 1, and the value of "2H–Vin" may be calculated for each polymer from the known degree of hydrogenation, H, (%) and the known vinyl percentage, Vin, (%) shown in Table 1. Table 2 below lists the contents Table 1 with the values of A2915 and "2H–Vin".

TABLE 2

| Hydrogenated diene polymer species | Styrene percentage (%) | Vinyl percentage (%) | Degree of hydrogenation (%) | 2H - Vin (CH$_2$ increase index) | A2915 (Intensity of CH$_2$ antisymmetric stretching vibration peak) |
|---|---|---|---|---|---|
| Hydrogenated styrene-butadiene copolymer 1 | 9 | 35 | 72 | 109 | 0.0399 |
| Hydrogenated styrene-butadiene copolymer 2 | 8 | 37 | 77 | 117 | 0.0399 |
| Hydrogenated styrene-butadiene copolymer 3 | 8 | 35 | 74 | 113 | 0.0421 |
| Hydrogenated styrene-butadiene copolymer 4 | 8 | 34 | 84 | 134 | 0.0468 |
| Hydrogenated styrene-butadiene copolymer 5 | 8 | 26 | 59 | 92 | 0.0356 |
| Hydrogenated styrene-butadiene copolymer 6 | 8 | 25 | 76 | 127 | 0.0459 |

Figure 2:
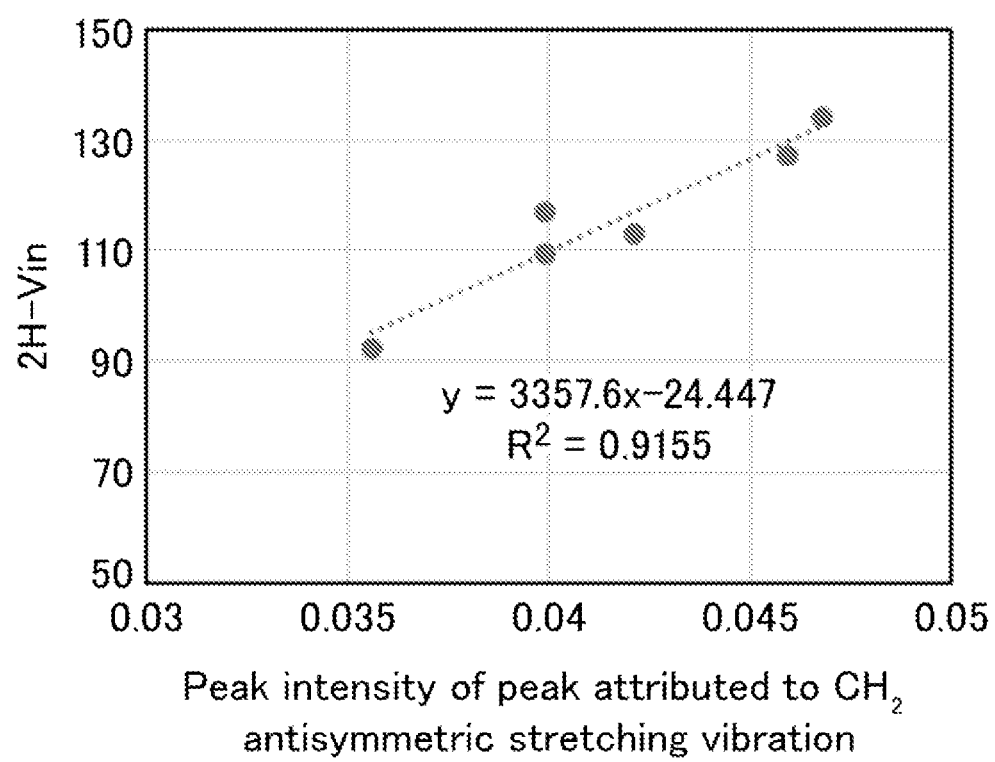
FIG. 2 is a graph showing the relationship between "2H−Vin" and the peak intensity of a peak attributed to $CH_2$ antisymmetric stretching vibration in each of the infrared absorption spectra of FIG. 1.

Moreover, FIG. 2 is a graph prepared by plotting the peak intensities (A2915) of the peaks attributed to CH$_2$ antisymmetric stretching vibration and the values of "2H–Vin" (H: degree of hydrogenation ($) of each spectrum, Vin: vinyl percentage (%) of each spectrum) from the property values of the hydrogenated styrene-butadiene copolymers to 6 shown in Table 2. Based on the plotted values, the constants a and b of the calibration curve "2H–Vin aA2915+b" can be determined to be 3357.6 and −24.447, respectively. In FIG. 2, a calibration curve with good linearity of R$^2$=0.9155 is obtained.

Horizontal axis: height of peak attributed to CH$_2$ antisymmetric stretching vibration at around 2915 cm$^{-1}$ (baseline: 3095 cm$^{-1}$ to 2750 cm$^{-1}$)

Vertical axis: 2×H (degree of hydrogenation (%–Vin (vinyl percentage (%))

Here, in the method of the present disclosure, the vinyl percentage (%) is not the vinyl percentage (5) out of 100% (100% of conjugated diene units)=vinyl percentage (vin (%))+cis percentage (cis (%))+trans percentage (trans (%)) but the vinyl percentage (%) out of 100% (total hydrogenated diene polymer)=vinyl percentage (%)+percentage (%)+trans percentage (%)+other monomer percentage (%). For example, the vinyl percentage (%) of a hydrogenated styrene-butadiene copolymer refers to the vinyl percentage (%) out of 100% (total hydrogenated styrene-butadiene copolymer)=vinyl percentage (%)+cis percentage (%)+trans percentage (%)+styrene percentage (%).

Similarly, other monomer percentages (%) such as cis percentage (%), trans percentage (%), and styrene percentage (%) also refer to those out of 100% (total hydrogenated styrene-butadiene copolymer).

Herein, the term "2×H–vin" defines the following CH$_2$ increase index based on the fact that hydrogenation of a diene polymer produces CH$_2$ at two sites when one cis bond (cis) or trans bond (trans) is hydrogenated, and produces CH$_2$ at one site when one vinyl bond (vin) is hydrogenated.

CH$_2$ increase index =

$H_{cis} \times R_{cis}/100 \times 2 + H_{trans} \times R_{trans}/100 \times 2 + H_{vin} \times R_{vin}/100$ (Proportion of hydrogenated cis double bonds based on total double bonds (%)×2 + Proportion of hydrogenated trans doublebonds based on total double bonds (%)×2 + Proportion of hydrogenated vin double bonds based on total double bonds (%))

$= (H_{all} - H_{vin} \times R_{vin}/100) \times + H_{vin} \times R_{vin}/100$ $= (H_{all} - R_{vin}) \times 2 + R_{vin}$ $= 2 \times H_{all} - R_{vin}$ where $H_{vin}$; $H_{trans}$, $H_{cis}$: Degree of hydrogenation of vin, trans, or cis (%);

$H_{all}$: Total degree of hydrogenation (%);

$R_{sty}$, $R_{vin}$, $R_{trans}$, $R_{cis}$: Percentage of sty, vin, trans, or cis (%); and $R_{sty}+R_{vin}+R_{trans}+R_{cis}=100(\%)$ From the above, "2×H–vin" is used in the present disclosure.

Next, the effectiveness of the calibration curve "2H–Vin=3357.6×A2915−24.447" created as described above will be verified below.

For example, hydrogenated styrene-butadiene copolymers 7 to 10 with unknown degrees of hydrogenation (%) and the known styrene percentages (%) and vinyl percentages (%) shown in Table 3 below are prepared.

TABLE 3

| Hydrogenated diene polymer species | Styrene percentage (%) | Vinyl percentage (%) |
|---|---|---|
| Hydrogenated styrene-butadiene copolymer 7 | 8 | 37 |
| Hydrogenated styrene-butadiene copolymer 8 | 8 | 33 |
| Hydrogenated styrene-butadiene copolymer 9 | 10 | 33 |
| Hydrogenated styrene-butadiene copolymer 10 | 16 | 23 |

Figure 3:
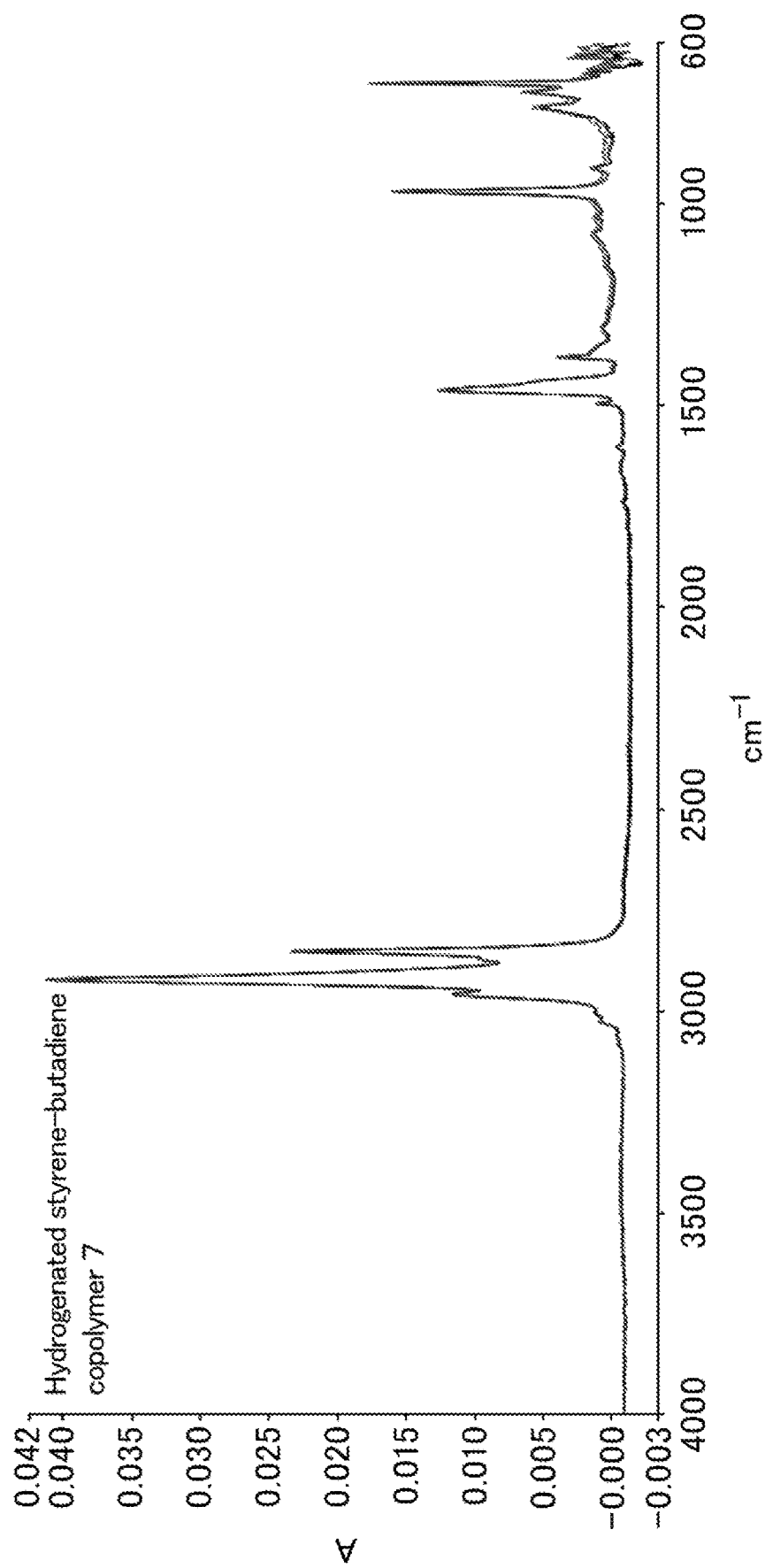
FIG. 3 is a chart showing an infrared absorption spectrum of a hydrogenated styrene-butadiene copolymer 7.

Infrared absorption spectra of the hydrogenated styrene-butadiene copolymers 7 to 10 may be obtained in the same manner as in FIG. 1. FIG. 3 shows the infrared absorption spectrum of the hydrogenated styrene-butadiene copolymer 7 as an exemplary infrared absorption spectrum. The peak intensity (A2915) of a peak attributed to CH$_2$ antisymmetric stretching vibration may be measured as described above.

Then, the obtained peak intensity (A2915) of a peak attributed to CH$_2$ antisymmetric stretching vibration of the hydrogenated diene polymer and the vinyl percentage, Vin, (%) shown in Table 3 may be applied to the calibration curve "2H–Vin 3357.6×A2915−24.447". Thus, the degree of hydrogenation H (%) of each of the hydrogenated styrene-butadiene copolymers 7 to 10 can be calculated.

Table 4 below lists the contents of Table 3 with the degrees of hydrogenation H (%) calculated above and, further, the specification values (product specification values) of the hydrogenated styrene-butadiene copolymers 7 to 10. Table 4 shows that the degrees of hydrogenation of the hydrogenated styrene-butadiene copolymers 7 to 10 calculated above fall within ±2% of the respective specification values. This results sufficiently demonstrate the effectiveness of the method of analyzing the degree of hydrogenation of the present disclosure.

TABLE 4

| Hydrogenated diene polymer species | Styrene percentage (%) | Vinyl percentage (%) | A2915 (Intensity of $CH_2$ antisymmetric stretching vibration peak) | Degree of hydrogenation calculated from calibration curve (%) | Specification value with respect to degree of hydrogenation (%) |
|---|---|---|---|---|---|
| Hydrogenated styrene-butadiene copolymer 7 | 8 | 37 | 0.0420 | 77 | 77 |
| Hydrogenated styrene-butadiene copolymer 8 | 8 | 33 | 0.0432 | 77 | 79 |
| Hydrogenated styrene-butadiene copolymer 9 | 10 | 33 | 0.0396 | 71 | 73 |
| Hydrogenated styrene-butadiene copolymer 10 | 16 | 23 | 0.0348 | 58 | 58 |

Although the above method is described with exemplary hydrogenated styrene-butadiene copolymers, it is also applicable to other hydrogenated diene polymers such as hydrogenated polybutadiene polymers and hydrogenated polyisoprene polymers. Among these, the method is suitably applicable to hydrogenated styrene-butadiene copolymers.

Moreover, not only samples consisting only of hydrogenated diene polymers but also samples containing other components in addition to these polymers may be applied to the present disclosure. For example, any component known in the field of rubber compositions may be used as such other components.

Examples of other components that may be compounded into the samples include fillers.

Any filler may be used, including materials known in the rubber field. Examples include inorganic fillers such as carbon black, silica, calcium carbonate, talc, alumina, clay, aluminum hydroxide, aluminum oxide, and mica; and hard-to-disperse fillers.

Other examples of other components that may be compounded into the samples include silane coupling agents, plasticizers (e.g., liquid plasticizers (plasticizers that are liquid at room temperature (25° C.)), and resins (e.g., resins that are solid at room temperature (25° C.)). Examples of the liquid plasticizers include oils and liquid resins. Examples of the resins include aromatic vinyl polymers, coumarone-indene resins, coumarone resins, indene resins, phenol resins, rosin resins, petroleum resins, terpene resins, and acrylic resins, all of which are solid at room temperature (25° C.).

Other examples of other components that may be contained in the samples include antioxidants, stearic acid, zinc oxide, waxes, cross-linking agents (e.g., sulfur), and vulcanization accelerators ((e.g., sulfenamide vulcanization accelerators, guanidine vulcanization accelerators, and benzothiazole vulcanization accelerators).

In the samples to be applied to the present disclosure, the amounts of the components such as hydrogenated diene polymers as rubber components, hydrogenated diene polymers as plasticizers, and other components are not limited and can be appropriately selected. For example, when tire components are used as the samples to be analyzed, the known amounts of the constituent components of the tire components may be appropriately selected.

The present disclosure is applicable to any sample containing a hydrogenated diene polymer, such as tire components. Any tire component may be used, and examples include treads (cap treads and base treads), belt layers, sidewalls, bead apexes, clinch apexes, innerliners, undertreads, breaker toppings, and ply toppings.

Exemplary embodiments of the present disclosure include:

Embodiment 1. A method of analyzing a degree of hydrogenation of a hydrogenated diene polymer using infrared absorption spectroscopy, the method including use of a calibration curve represented by the following equation (1).

$$2H-Vin=aA2915+b$$

where H is a degree of hydrogenation (%) of a hydrogenated diene polymer, Vin is a vinyl percentage (%) of the hydrogenated diene polymer, A2915 is a peak intensity of a peak attributed to $CH_2$ antisymmetric stretching vibration, and a and b are each a constant.

Embodiment 2. The method of analyzing a degree of hydrogenation according to Embodiment 1, wherein the infrared absorption spectroscopy includes an ATR method.

Embodiment 3. The method of analyzing a degree of hydrogenation according to Embodiment 1 or 2, wherein the hydrogenated diene polymer is a hydrogenated styrene-butadiene copolymer.

Embodiment 4. The method of analyzing a degree of hydrogenation according to any combination with any one of Embodiments 1 to 3, wherein the hydrogenated diene polymer satisfies the following relationship (2)

$$H \geq Vin$$

where H is the degree of hydrogenation (%) of the hydrogenated diene polymer, and Vin is the vinyl percentage (%) of the hydrogenated diene polymer.

Embodiment 5. The method of analyzing a degree of hydrogenation according to any combination with any one of Embodiments 1 to 4, wherein the degree of hydrogenation of the hydrogenated diene polymer is analyzed by analysis of a sample containing the hydrogenated diene polymer and a filler using infrared absorption spectroscopy.

The invention claimed is:

1. A method of analyzing a degree of hydrogenation of a hydrogenated diene polymer using infrared absorption spectroscopy, the method comprising use of a calibration curve represented by the following equation (1):

$$2H-Vin=aA2915+b$$

where H is a degree of hydrogenation (%) of a hydrogenated diene polymer, Vin is a vinyl percentage (%) of the hydrogenated diene polymer, A2915 is a peak intensity of a peak attributed to $CH_2$ antisymmetric stretching vibration, and a and b are each a constant.

2. The method of analyzing a degree of hydrogenation according to claim 1,
   wherein the infrared absorption spectroscopy comprises an ATR method.

3. The method of analyzing a degree hydrogenation according to claim 1,
   wherein the hydrogenated diene polymer is hydrogenated styrene-butadiene copolymer.

4. The method of analyzing a degree of hydrogenation according to claim 1,
   wherein the hydrogenated diene polymer satisfies the following relationship (2):

$$H \geq Vin$$

where H is the degree of hydrogenation (%) of the hydrogenated diene polymer, and Vin is the vinyl percentage (%) of the hydrogenated diene polymer.

5. The method of analyzing a degree of hydrogenation according to claim 1,
   wherein the degree of hydrogenation of the hydrogenated diene polymer is analyzed by analysis of a sample containing the hydrogenated diene polymer and a filler using infrared absorption spectroscopy.

* * * * *